United States Patent [19]

Anhalt et al.

[11] Patent Number: 5,333,100
[45] Date of Patent: Jul. 26, 1994

[54] DATA CARD PERIMETER SHIELD

[75] Inventors: John W. Anhalt, Orange; William H. Doose, Anaheim Hills; William Galarza, Jr., Laguna Hills, all of Calif.

[73] Assignee: ITT Corporation, Secaucus, N.J.

[21] Appl. No.: 906,179

[22] Filed: Jun. 29, 1992

[51] Int. Cl.⁵ .......................... H05K 9/00; H05K 1/14
[52] U.S. Cl. ..................................... 361/818; 361/736; 361/752; 361/760; 174/35 R
[58] Field of Search .......................... 235/380, 441, 492; 361/392, 393, 394, 395, 399, 400, 409, 424; 174/35 R, 35 MS, 51

[56] References Cited

U.S. PATENT DOCUMENTS

| | | |
|---|---|---|
| 3,200,361 | 8/1965 | Schwartz et al. |
| 3,372,310 | 3/1968 | Kantor . |
| 4,146,291 | 3/1979 | Goff et al. . |
| 4,532,419 | 7/1985 | Takeda ................................. 361/212 |
| 4,789,347 | 12/1988 | Banjo et al. ........................ 439/140 |
| 4,821,146 | 4/1989 | Behrens et al. ..................... 361/383 |
| 4,872,091 | 10/1989 | Maniwa et al. ..................... 361/424 |
| 4,955,817 | 9/1990 | Sugai ..................................... 439/60 |
| 5,107,767 | 5/1991 | Mizuno ............................... 361/399 |

FOREIGN PATENT DOCUMENTS

| | | |
|---|---|---|
| 0417648 | 9/1990 | European Pat. Off. . |
| 4107191 | 4/1992 | Japan . |
| 2243493 | 2/1991 | United Kingdom . |
| 2248973 | 10/1991 | United Kingdom . |

Primary Examiner—Leo P. Picard
Assistant Examiner—Bot L. Ledynh
Attorney, Agent, or Firm—Thomas L. Peterson

[57] ABSTRACT

A data card is provided which has an electrically conductive rail (70, 72 FIG. 2) extending along its opposite sides and part of its rear, and connected to the ground plane (60) of a circuit board (46) of the card, to provide EMI (electromagnetic interference) shielding along the perimeter of the card. The rail has top and bottom edge portions (94, 96 FIG. 6) that are each bent into a U shape to extend around top and bottom ridges at the side of the card body to lock the rail in place. One edge portion includes a projecting tab (110) which is bent to extend inwardly and engage the ground plane (60) of the circuit board. The molded card body has a through hole (114) in its side portion, and the tab can extend into that hole before extending inwardly to the circuit board ground plane.

10 Claims, 4 Drawing Sheets

DATA CARD PERIMETER SHIELD

BACKGROUND OF THE INVENTION:

Data cards are commonly constructed with a molded plastic body of moderate width and length such as 5.3 cm by 8.5 cm, but small thickness such as 5 mm. A circuit board assembly that is installed on the body, includes one or more integrated circuits that usually store data but may include only processing circuitry. Metallic top and bottom covers complete the card. Such data cards are especially useful in electronic equipment or devices of small thickness, such as lap top computers that may have a thickness of much less than one inch. Standard JEIDA cards have a thickness of five millimeters, which enables them to be inserted into thin slots of the electronic device.

While the top and bottom metallic covers provide good EMI (electromagnetic interference) shielding, there still can be considerable leakage through the perimeter of the card. A perimeter EMI shielding which added a minimal amount to the size of the card, and which was readily installable so it securely held to the molded body and was connected to the ground plane of the circuit board, and which preferably also helped to ground the covers, would be of value.

SUMMARY OF THE INVENTION

In accordance with one embodiment of the present invention, a data card is provided which has perimeter EMI (electromagnetic interference) shielding which does not substantially increase the dimensions of the card and which is easily installed to hold securely to the rest of the card and to be grounded to the ground plane of a circuit board of the card. The shielding includes at least one electrically conductive rail formed of sheet metal, the rail covering most of the area at one side of the card and being connected to the ground plane of the circuit board assembly of the card. Each body side is molded to have a pair of ridges at its top and bottom, and the sheet metal rail has top and bottom edge portions that are each bent in a substantially U shape to extend around each ridge. Each side of the card has a support wall for supporting a face of the circuit board and a locating wall extending around the board. One of the edge portions of the rail includes a projecting tab that extends to a location between the support wall and the ground plane that lies on a peripheral portion of the circuit board, to connect to the ground plane.

The side portion of the molded body preferably has a hole extending from its top to its bottom and lying immediately inside the ridges, and a tab of the rail extends through the slot before the tab is bent. The locating wall can have a slot through which the tab is bent to lie between the support wall and circuit board peripheral portion.

The novel features of the invention are set forth with particularity in the appended claims. The invention will be best understood from the following description when read in conjunction with the accompanying drawings.

DESCRIPTION OF THE PREFERRED EMBODIMENT

Figure 1:
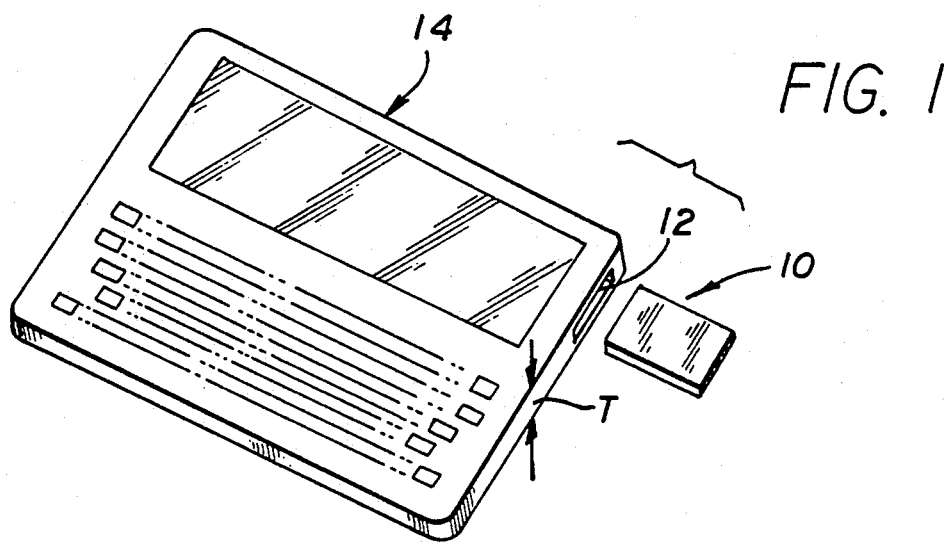
FIG. 1 is an isometric view of a data card of the present invention, showing it in conjunction with an electronic device which can receive it.
Figure 2:
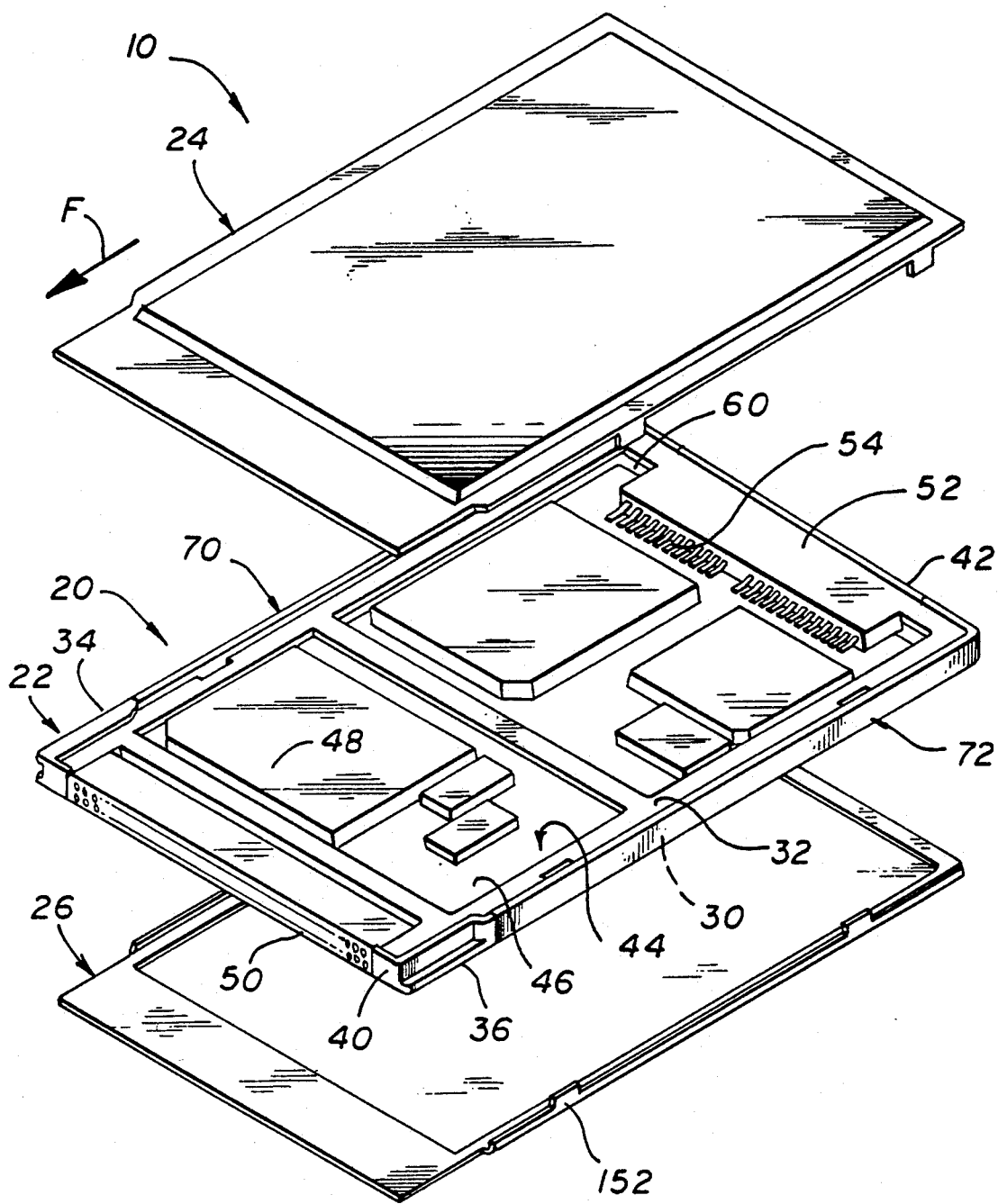
FIG. 2 is an exploded isometric view of the data card of FIG. 1.

FIG. 1 illustrates a data card 10 of the present invention, which is adapted to be inserted into a slot 12 of an electronic device 14. The particular device shown being a thin lap top computer. As shown in FIG. 2, the data card includes a frame 20 comprising a molded plastic body 22 and top and bottom covers 24, 26. The body 22 has a top and bottom 30, 32, first and second opposite sides 34, 36, and forward and rearward ends 40, 42. A circuit board assembly 44 is mounted on the body 22, the assembly including a circuit board 46 and a plurality of electronic components including an integrated circuit component 48 mounted on the circuit board. A connector 50 mounted on the forward end of the body is connected to multiple traces on the board, of which at least some extend to the electronic components mounted on the board. When the data card 10 is moved in a forward direction F into an electronic device, contacts of the connector 50 engage corresponding contacts on the electronic device. In many cases, the integrated circuit components such as 48 store data. The particular data card shown include a rear connector 52 which can receive a miniature plug (not shown) to enable transmission of data between the card and an outside source (e.g. a modem), the connector having multiple contacts 54 engaged with multiple traces on the circuit board.

It is highly desirable to provide EMI (electromagnetic interference) shielding for the data card, to suppress the passage of signals into the card that might be picked up by circuitry in the card, and to suppress the radiation of signals by the card. When the card lies deep within an electronic device such as a lap top computer, it is especially important to suppress the transmission of signals from the card that might be picked up by circuitry in the electronic device. The top and bottom covers 24, 26 are formed of conductive material such as stainless steel, to provide good EMI shielding. However, prior data cards have not provided good shielding along the perimeter of the card, that is, the outside of the card between the top and bottom covers. The molded frame 22 is generally molded of material of low conductivity (at least about two orders of magnitude less than that of copper, and generally at least four orders of magnitude less).

Figure 3:
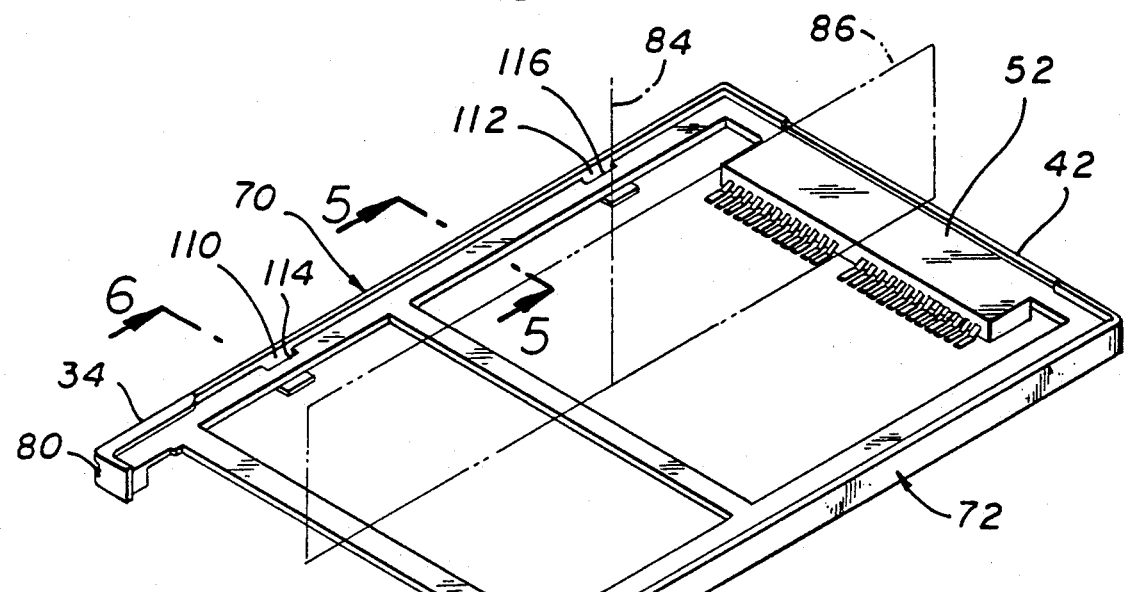
FIG. 3 is an isometric view of the body of the card of FIG. 2, with the shielding rails attached, but without the circuit board assembly or covers in place.
Figure 4:
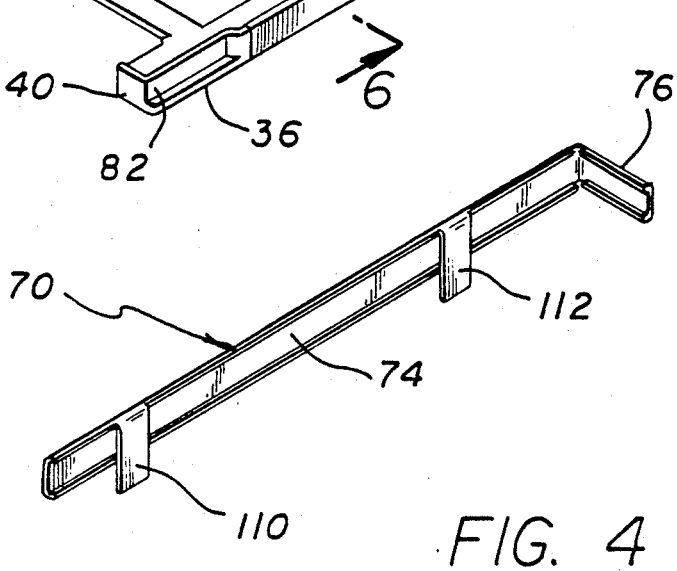
FIG. 4 is an isometric view of one of the rails of the card of FIG. 3, in its fully deformed position except for the tabs thereof.

In accordance with the present invention, EMI shielding is provided around much of the perimeter of the data card, by perimeter shield rails 70, 72. As shown in FIGS. 3 and 4, each rail such 70 is formed from sheet metal, as by forming it of 4 thousandth inch thick copper alloy which is gold plated. Each rail has a side portion 74 that extends along a corresponding side 34 of the body 22, and an end portion 76 which extends 90° from the side portion to extend along part of the rearward end 42 of the body. It would be feasible to use a single rail which extends around both the opposite sides 34, 36 and the rear end 42. However, the middle of the rear end is occupied by pin-receiving holes of the rear connector 52 which must receive pins of a mating connector, which makes it more difficult to use a single rail. The connector 52 can be formed with an EMI barrier structure, but the rails 70, 72 do not extend behind the connector. In a similar manner, the front connector (50 in FIG. 2) is not shielded by the rails, and the forward portions of each side are not shielded because of the need for polarizing keys 80, 82 at the front end. However, each rail such as 70 has a height slightly more than the height of the body 22 and a length more than half the length of the body (between its ends 40, 42) so each side rail covers most of the peripheral area at each side 34, 36 of the data card. In fact, each rail covers about 80% of the area of each side. The end portions 76 of the two rails cover about one third of the rear peripheral portion of the card. The data card has an imaginary vertical axis 84 that is equally spaced from its opposite sides and from its opposite ends, and has an imaginary longitudinal centerplane 86 lying halfway between the opposite sides 34, 36.

Figure 5:
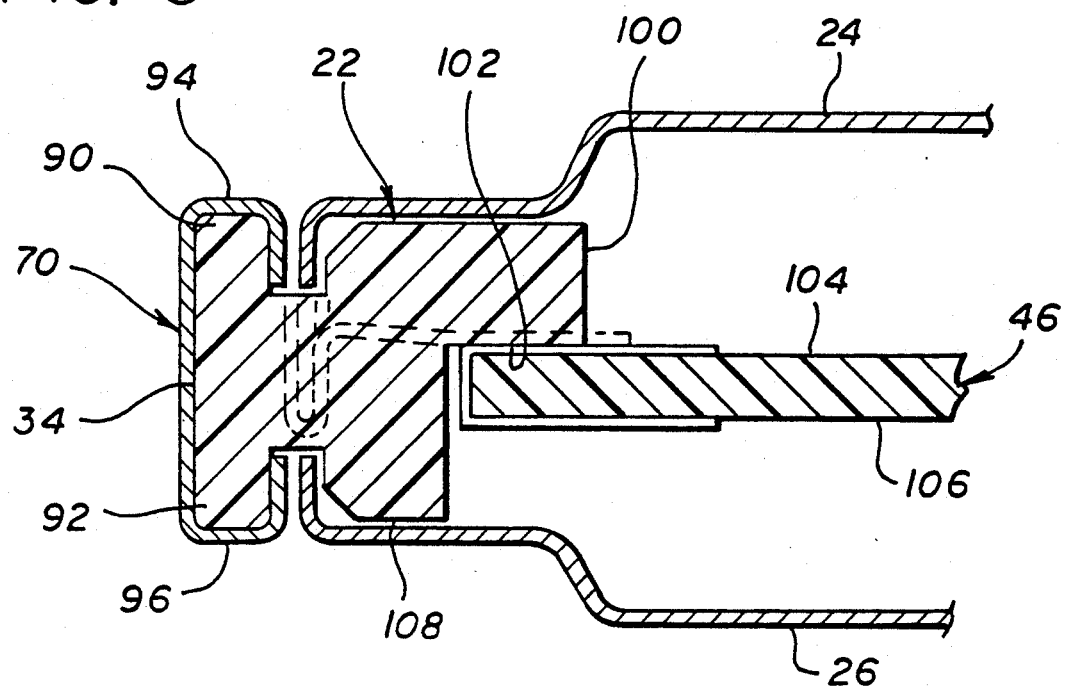
FIG. 5 is a partial sectional view taken on the line 5—5 of FIG. 3, but with the circuit board assembly and covers in place.
Figure 7:
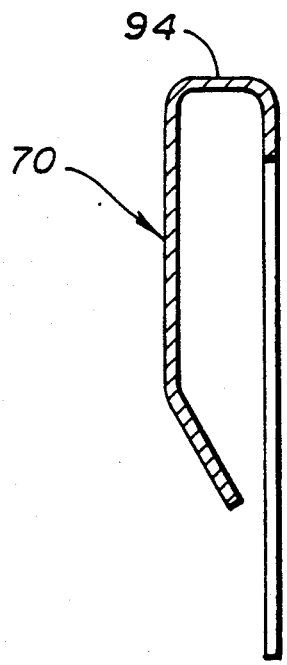
FIG. 7 is a sectional view of the rail of FIG. 4, prior to its installation on the card body.
Figure 8:
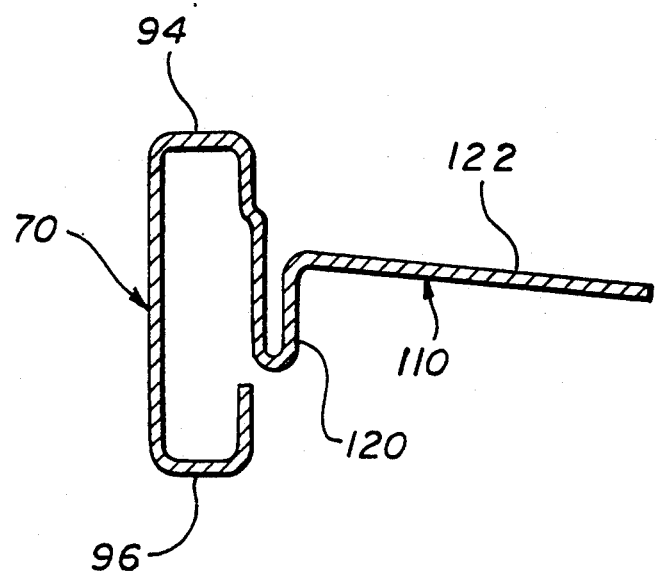
FIG. 8 is a sectional view of the rail of FIG. 7, taken through a tab thereof, showing it in its fully formed position.

As shown in FIG. 5, each body side such as 34 has top and bottom ridges 90, 92. The rail 70 has top and bottom edge portions 94, 96 that are each bent in a U shape to extend around each ridge, and thereby securely hold the rail to the body side. The body has a support wall 100 that forms a support surface 102 that supports the circuit board 46. There is substantial space between the top face 104 of the circuit board and the top cover 24, and between the bottom face 106 of the circuit board and the bottom cover 26. Electronic components on the circuit board can lie on and project from the top face and/or bottom face of the circuit board, and the space accommodates such projecting components. The body also forms a sideward locating wall 108 which closely surrounds the circuit board 46.

Figure 6:
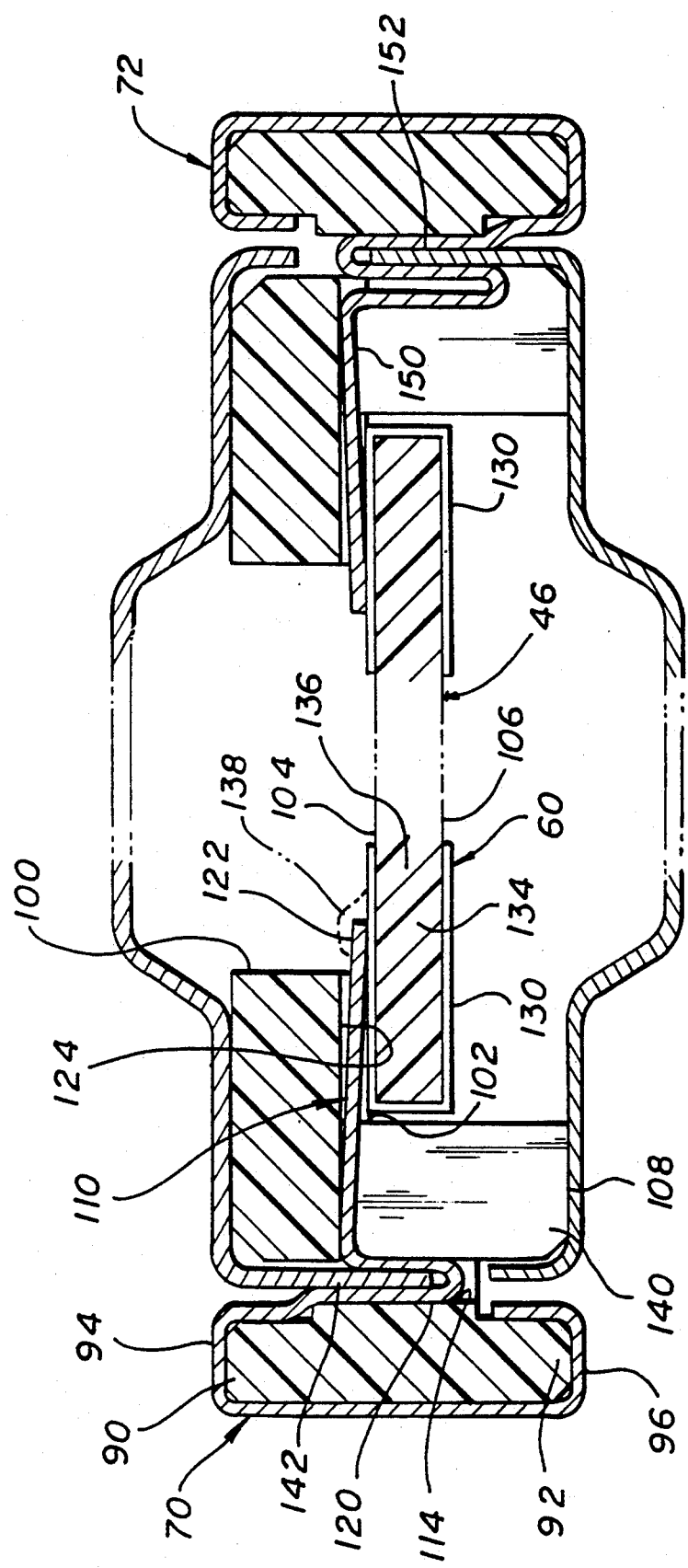
FIG. 6 is a sectional view taken on the line 6—6 of FIG. 3 with the circuit board assembly and covers in place.

As shown in FIGS. 3 and 6, the rail 70 has a pair of tabs 110, 112 which are designed to project down through a pair of through holes 114, 116 in the body side or side portion 34. Each tab is bent into a narrow U curve at 120, to leave a tab free end 122 extending along the bottom of the support wall 100. The free end 122 extends inwardly (toward the longitudinal centerplane 86 and at least partially toward the axis 84). The support wall has a recess 124 for accommodating the free end of each tab, to enable the circuit board to lie securely against the support surface 102 and still allow the free end 122 of the tab to pass to a position to engage the circuit board 46. The ground plane 60 of the circuit board includes a peripheral portion 130 that extends on the top and bottom faces 104, 106 at the peripheral portion 134 of the board 136 of the circuit board. As a result, the free end 122 of the tab engages the peripheral portion 130 of the ground plane of the circuit board, to thereby connect the circuit board ground plane to the rail 70. It may be noted that the tab free end 122 will be soldered to the ground plane as indicated at 138. Also, the circuit board can be securely held to the body as by adhesive.

The locating wall 108 at the body side has a slot 140 at the location of each tab. The slot facilitates forming of the tab 110 after it is projected downwardly through the hole 114 in the body. After such downward projection, the tab is deformed as shown. The U curve 120 in the tab is useful to receive a projection 142 formed along the edge of the top cover 24. This serves to ground the top cover 24 as well as helping to hold the cover in place. It may be noted that the cover also can be held to the body by adhesive, and also can be grounded by a grounding contact comparable to contact 54A shown in FIG. 2.

The other rail 72 is attached to the body in a similar manner, except that its tabs such as 150 are differently bent as shown. The tab 150 engages the peripheral portion 130 of the circuit board ground plane and receives a bottom cover projection 152. The tabs can serve not only to ground the rail and the cover, but also to prevent shifting of the rail. Where the top and bottom covers are readily removable, the U loops of the tabs provide a means to help ground the tabs and help hold them in position.

Thus, the invention provides means for providing EMI (electromagnetic interference) protection along the periphery of a data card, in a low cost construction that adds minimally to the width and length of the card. This is accomplished by providing at least one electrically conductive rail formed of sheet metal that extends along at least one side of the body and covers more than half the height and length to thereby cover most of the area of the body side. The rail is electrically connected to the ground plane of the circuit board mounted in the body. Where a rear connector is provided on the data card, two rails are used, which each has a side portion covering most of the area at a corresponding side of the body of the card frame, and having a 90° bent end portion covering a portion of the rear end of the body. The body can be molded with top and bottom vertically extending ridges, and the rail can be formed with top and bottom edge portions that extend in substantially a U bend around each ridge. The rail can be provided with at least one tab extending from one of the edge portions, with the tab extending through a through hole formed in the body immediately inside the ridges. After the tab is projected downwardly through a hole, it is bent so a free end of the tab lies against a support wall that supports the circuit board assembly, and preferably lies in a recess in the support wall.

It should be noted that terms such as "top", "bottom", "vertical", etc. have been used herein only to aid in the description of the invention, and that the data card can be used in any orientation with respect to gravity.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. A data card comprising:
    a frame which includes a body molded of plastic material that has a conductivity at least about two orders of magnitude less than that of copper, said body having opposite side portions, opposite end portions, and top and bottom portions, said frame also having electrically conductive top and bottom covers;

a circuit board assembly mounted on said body and lying in said frame, said assembly including a board having a ground plane;

at least one electrically conductive elongated rail which lies over more than half of the area of at least a first of said body sides, said rail being formed of sheet metal and having top and bottom portions that are each bent around at least part of a corresponding one of said body side portions to attach to said body, said rail being electrically connected to said ground plane of said circuit board and to said top and bottom covers.

2. The card described in claim 1 wherein:

said at least one rail includes two rails, each having an elongated portion lying over most of the area of a different one of said body sides and each having a shorter portion angled 90° from the long portion and extending over part of a rearward one of said body ends.

3. The card described in claim 1 wherein:

said frame has an axis, and said first body side has a through hole lying immediately inward of a ridge;

said rail top portion forms an elongated tab which extends downwardly into said body hole and which is bent to extend at least partially inwardly and which is connected to said ground plane of said circuit board assembly.

4. The card described in claim 3 wherein:

said body has an imaginary vertical centerplane lying halfway between said opposite sides;

said top cover is formed of sheet metal, has a downwardly extending edge portion, and has at least one cover projection extending downwardly from said edge portion;

said tab extends in a narrow 180° loop having opposite sides in said hole, with the center of said loop being lowermost, and includes an outer end portion extending toward said body centerplane and connected to said board ground plane;

said top cover projections extends down into said hole and lies between opposite sides of said 180° loop.

5. The card described n claim 1 wherein:

at least said first side portion has upwardly and downwardly extending ridges respectively at its top and bottom, and said rail top and bottom portions are each bent around a corresponding one of said ridges.

6. A data card which includes a frame having a molded plastic body with a top and a bottom, opposite sides, and forward and rearward ends, said frame also having electrically conductive top and bottom covers lying respectively on said top and bottom of said body, said card also including a circuit board assembly which lies in said frame and which includes a board having a ground plane and a plurality of circuit components mounted on said board, wherein said board has top and bottom opposite faces and a peripheral portion and said ground plane lies on at least one of said board faces at said peripheral portion, characterized by:

at least one electrically conductive rail formed of sheet metal and extending along at least one of said sides of said body, said rail extending along more than half the height and along more than half the length of said one body side to cover more than half of the area of said one side, and said rail being electrically connected to said board ground plane;

said body has a support wall for supporting said top face of said board peripheral portion, and said body has a sideward locating wall extending down from said support wall and surrounding said board;

said rail has top and bottom rail edge portions and one of said rail edge portion includes a projecting tab that extends to a location between said support wall and said board peripheral portion and which engages said ground plane thereat.

7. The card described in claim 6 wherein:

said body locating in wall has a slot extending to slightly above the bottom of said support wall, and said support wall has a recess aligned with slot;

said tab extends through said slot and lies in said recess and engages a ground plane portion that lies against said support wall.

8. The card described in claim 6 wherein:

said one of said body sides has a through hole extending between its top and bottom with at least part of said hole lying inward of ridges;

said rail has upper and lower edge portion, said tab extends from said upper edge portion and downwardly into said hole, and said tab is bent to extend through a slot into a recess.

9. A data card which includes a frame having a molded plastic body with a top and bottom, opposite sides, and forward and rearward ends, said frame also having electrically conductive top and bottom covers lying respectively on said top and bottom of said body, said card also including a circuit board assembly which lies in said frame and which includes a board having a ground plane and a plurality of circuit components mounted on said board, characterized by:

at least one electrically conductive rail formed of sheet metal and extending along at least one of said sides of said body, said rail being electrically connected to said board ground plane;

said rail lies on the outside of said frame and has an inwardly-extending sheet metal portion that directly engages said ground plane.

10. The card described in claim 9 wherein:

said body has a slot through which said inwardly-extending sheet metal portion extends and at least one of said covers directly engages aid inwardly-extending sheet metal portion.

* * * * *